United States Patent [19]

Marshall

[11] Patent Number: 4,626,671
[45] Date of Patent: Dec. 2, 1986

[54] LENS SYSTEM FOR OPTICALLY RECORDED STORAGE CARD READER

[75] Inventor: J. Nathaniel Marshall, Boston, Mass.

[73] Assignee: Honeywell Information Systems Inc., Waltham, Mass.

[21] Appl. No.: 628,353

[22] Filed: Jul. 6, 1984

[51] Int. Cl.$^4$ ............................................. G06K 7/10
[52] U.S. Cl. .................................... 235/470; 235/454; 250/569; 365/215
[58] Field of Search ............... 235/462, 467, 470, 454; 250/566, 569; 365/215

[56] References Cited

U.S. PATENT DOCUMENTS

| | | | |
|---|---|---|---|
| 3,742,225 | 6/1973 | Sick et al. | 235/470 X |
| 3,812,328 | 5/1974 | Tramposch | 235/488 X |
| 3,812,459 | 5/1974 | MacNeill et al. | 235/470 X |
| 4,408,120 | 10/1983 | Hara et al. | 235/454 X |
| 4,505,537 | 3/1985 | Funato | 235/454 X |
| 4,510,383 | 4/1985 | Ruppender | 235/462 |

Primary Examiner—David L. Trafton
Attorney, Agent, or Firm—William A. Linnell; George Grayson; John S. Solakian

[57] ABSTRACT

An optical storage card reading system using a cylindrical lens is disclosed which provides for a large viewing cone at the surface of the optical storage card thus improving the ability to read optically recorded data despite scratches or dust on the optical storage card.

2 Claims, 7 Drawing Figures

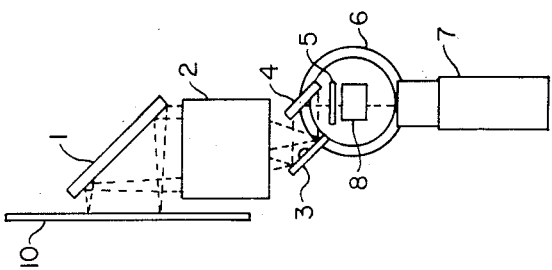
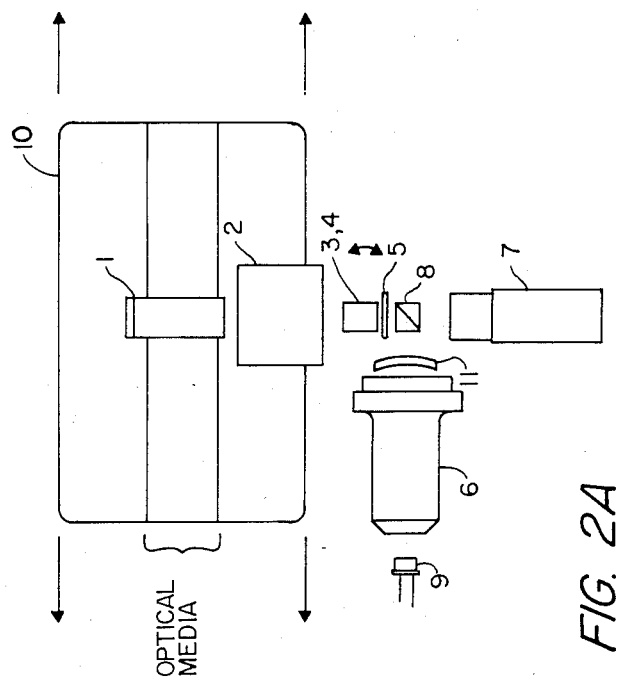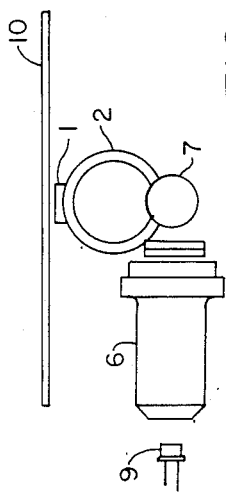
FIG. 2C PRIOR ART
FIG. 2A PRIOR ART
FIG. 2B PRIOR ART

LENS SYSTEM FOR OPTICALLY RECORDED STORAGE CARD READER

BACKGROUND OF THE INVENTION

1. Field of the Invention

This invention applies to scanners of optical media which have protective covers.

2. Description of the Prior Art

A description of optical storage cards can be found in U.S. Pat. No. 4,360,728. These cards have a transparent plastic cover to protect the recording media.

Insensitivity to dust, dirt and fingerprints is increased by having a wider aperture lens which has a large diameter beam at the surface. On the other hand, lenses with a wide field of view required for a reasonable angle of scan do not have large apertures. For example, a lens used in a system where the media is moved under a small lens creating a single spot may have a numerical aperture of 0.6. A lens in a system with charge coupled device (CCD) or mirror scanner is unlikely to exceed a numerical aperture of 0.25. The numerical aperture is the ratio of the lens diameter to focal length.

A solution which can support wide angle scanning and produces a large beam at the protective cover surface is described It is based on cyclindrical lenses.

A prior art system for reading optical storage cards is shown in FIG. 1. The microscope objective enlarges a strip of around 1-1.5 mm. on the card to an image of about ¼ inch on the surface of the CCD and has a numerical aperture around 0.25.

Another prior art system is shown in FIGS. 2A, 2B and 2C, which shows a mirror scanner which could scan a 16 mm. strip with a laser beam. Its numerical aperture will be no better than the system of FIG. 1. In fact, available lenses will have a smaller aperture because they have a wider field of view. In FIGS. 2A, 2B and 2C, the various elements are as follows: Element 1 is a fixed mirror approximately 32 mm. by 7 mm., 2 is a telecentric lens, 3 is a mirror approximately 6 mm. by 12 mm. rotated by a galvanometer (not shown), 4 is a fixed mirror, 5 is a quarter wave retarder, 6 is a microscope objective, 7 is a collimator and light source—probably a laser, 8 is a polarization splitter, 9 is a detector, 10 is the optical storage card, and 11 is a stigmatic lens element used if focus error signal is required (this is a section of ophthalmic lens used to correct an eye for astigmatism). In this system, for a smaller spot, change the collimator and lens parameters and increase the aperture of system. Note that the optics could be swapped around to bring the card nearer the center. The mirror angle effective "lever arm" is 25 mm., the plus or minus scan is 8 mm. and the mirror rotation is 17 degress giving a total scan of 34 degrees.

OBJECTS OF THE INVENTION

Accordingly, it is an object of the present invention to provide a optical storage card reading system that is more immune to scratches and dust on the surface of the optical storage card.

It is another object of the present invention to have inexpensive optical storage card reading systems.

It is a further object of the present invention to provide inexpensive systems with high data rates not limited by the practical speed of physical motions.

This invention is pointed out with particularity in the appended claims. An understanding of the above and further objects and advantages of this invention can be obtained by referring to the following description taken in conjunction with the drawings.

SUMMARY OF THE INVENTION

An optically recorded storage card system comprising a first cylindrical lens with a cylindrical component whose axis is perpendicular to the direction of scan, and a second cylindrical lens having a short focal length close to the surface of an optical stoage card to be read, the second cylindrical lens aligned with its axis parallel to the direction of scan of the data recorded on the optical storage card, the first and second cylindrical lenses together form the circular light source to a small circular illuminated spot at the media, thereby avoiding the consequences of dust and scratches on the surface of the protective cover over the media.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which:

FIGS. 2A, 2B and 2C are various views of a second prior art optical card reading system.

DESCRIPTION OF THE PREFERRED EMBODIMENT

Figure 1:
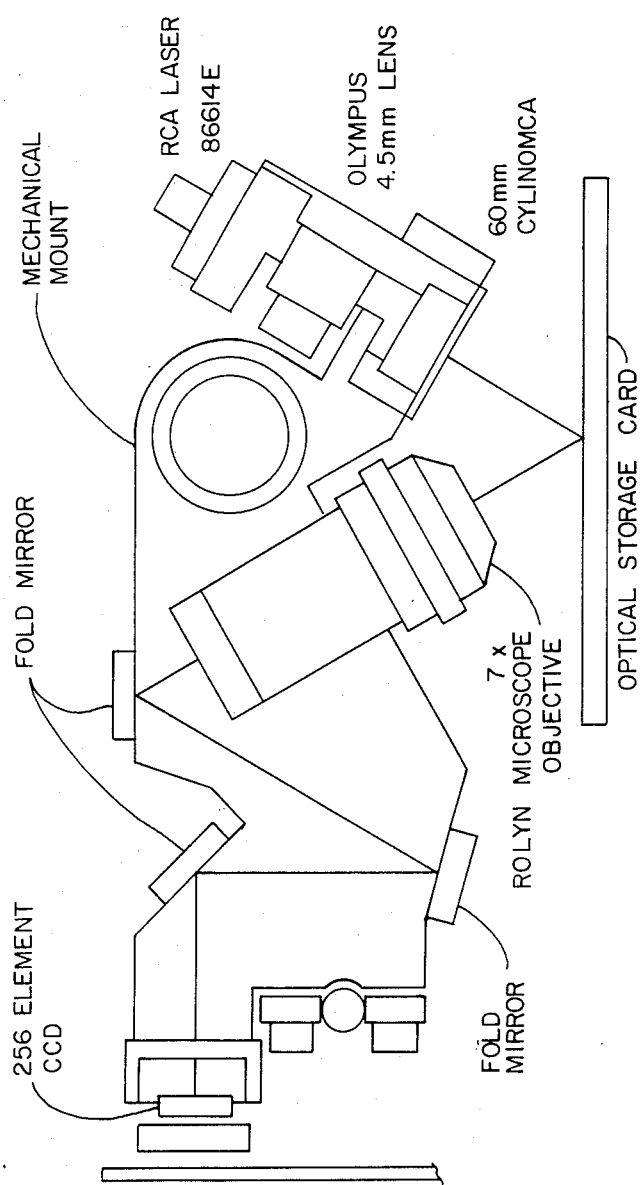
FIG. 1 is a first prior art optical card reading system.
Figure 3:
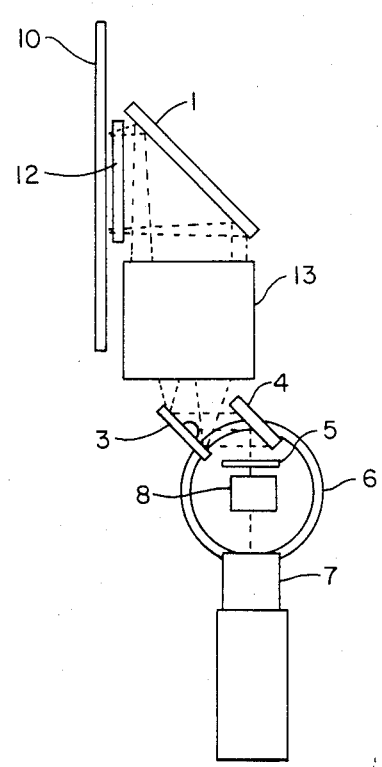
FIG. 3 is the optical card reading system of FIGS. 2A, 2B and 2C modified to have the cylindrical lens of the present invention.

The present invention recognizes that a cylindrical lens of wide aperture could be placed close to a card and have its long dimension (axis) along the direction of scan. All the elements in FIG. 3 correspond to the elements in the prior art system of FIGS. 2A, 2B and 2C, except that cylindrical lenses 12 and 13 of the present invention have been added or substituted. As shown in FIG. 3, lens 12 would be between the mirror 1 and the card 10. The telecentric lens 2 is replaced by another having a cylindrical component lens 13 which has approximately the same focal length as the lens which was replaced for the dimension parallel to the scan and a much longer focal length in the dimension perpendicular to the scan. As a result, the beam remains the same size from cylindrical lens 13 to lens 12 in the direction perpendicular to the scan and is only reduced (focused) in the direction parallel to the scan.

As a result, the beam size at the surface of the protective cover is increased. For a card in which the cover is typically 600 micron thick on the viewing side and typically 100 micron thick on the other side, the size of the beam at the surface of the cover can be calculated as follows.

Typical wide angle lens, f2 is 0.15 mm. in diameter.

Optical recording lens NA=0.6 mm. long by 0.75 mm. in diameter at the surface of the card Proposed cylindrical lens system 0.75 mm. long by 0.15 mm. wide at the surface of the card.

The invention extends the dimensions of the beam at the surface of the protective cover of the card in one dimension only, but this should protect against the great majority of defects in the 0.1–0.5 mm. size range. The invention obtains a significant improvement over existing designs for optically scanned systems without paying the penalty of difficult physical motions of the card which result from using video recording techniques in which the media moves for all scans.

Figure 4A:
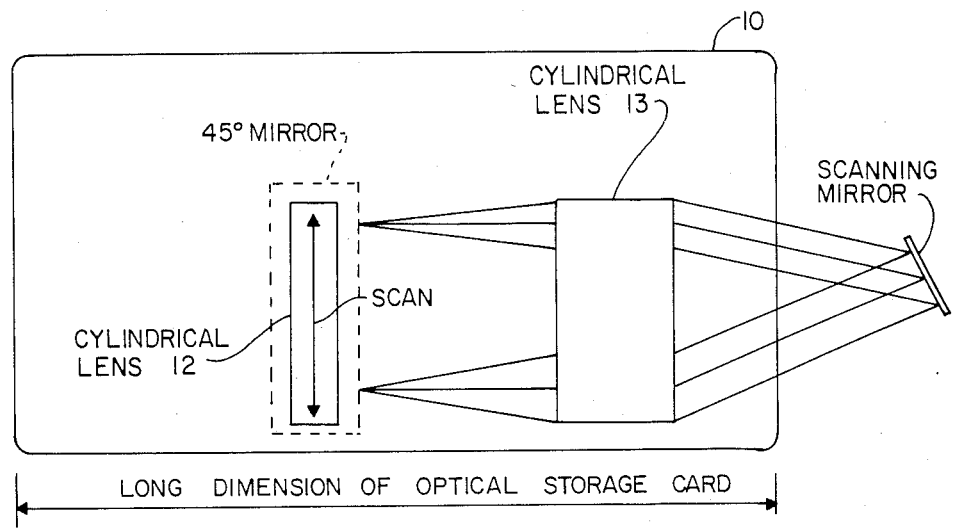
FIG. 4A shows a plan view of the two lenses of the invention.
Figure 4B:
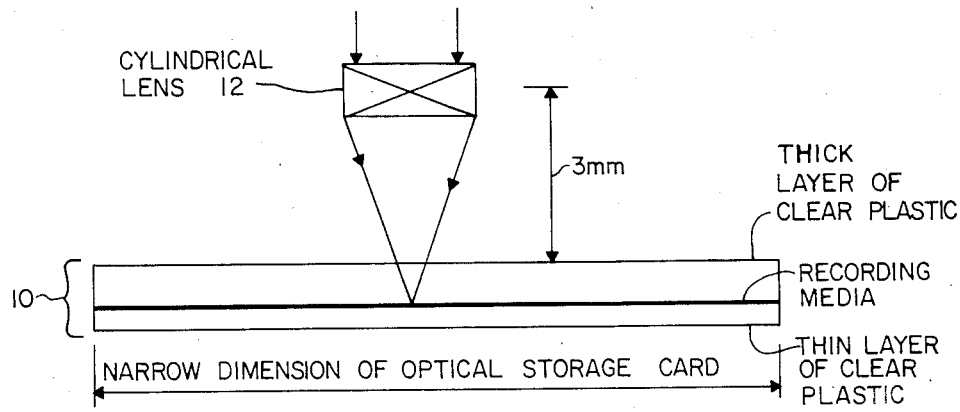
FIG. 4B shows a cross-sectional view of the beam between the second lens and the card.

Referring to FIGS. 3, 4A and 4B in the plane parallel to the card, lens 13 acts like the telecentric lens in the original concept. In the plane perpendicular to the card, it has infinite focal length. As a result, the beam in the dimension perpendicular to the scan is not focused and remains 5 mm. wide when it reaches lens 12, which focuses in that dimension resulting in the required spot. The beam size at the surface of the card may be almost a millimeter long though it will be only about 150 microns wide even with the thicker layer of plastic above the recording media. It will provide much better recording and reading around dust than a simple long focus lens though not quite as good as a short focus single lens using physical scanning of the optics.

While the invention has been shown and described with reference to the preferred embodiment thereof, it will be understood by those skilled in the art that the above and other changes in form and detail may be made therein without departing from the spirit and scope of the invention.

What is claimed is:

1. An optical storage card reader system comprising:
   a. a first cylindrical lens close to the surface of an optical storage card to be read, said first cylindrical lens focusing a beam in a plane parallel to the direction of scan of data recorded on the optical storage card; and
   b. a second cylindrical lens which focuses said beam in a plane perpendicular to the direction of said first cylindrical lens and said second cylindrical lens cooperating to focus said beam into a small spot and then collecting and focusing said beam reflected from the optical storage card into a receiver, thereby avoiding the consequences of defects on the surface.

2. The system of claim 1 wherein the optical storage card has a transparent cover covering the media on which said data is recorded, said second cylindrical lens being located close to the optical storage card in such a position as to collate a large unfocused beam on the surface of the transparent cover and a small focused beam on the media so that the beam received at said receiver is insensitive to the defects at the surface of the transparent cover.

* * * * *